US011750290B2

United States Patent
Strobel et al.

(10) Patent No.: US 11,750,290 B2
(45) Date of Patent: Sep. 5, 2023

(54) RECEIVER SYNCHRONIZATION FOR HIGHER SPEED PASSIVE OPTICAL NETWORKS

(71) Applicant: Intel Corporation, Santa Clara, CA (US)

(72) Inventors: Rainer Strobel, Munich (DE); Gert Schedelbeck, Munich (DE)

(73) Assignee: INTEL CORPORATION, Santa Clara, CA (US)

(*) Notice: Subject to any disclaimer, the term of this patent is extended or adjusted under 35 U.S.C. 154(b) by 157 days.

(21) Appl. No.: 17/117,206

(22) Filed: Dec. 10, 2020

(65) Prior Publication Data

US 2021/0184771 A1    Jun. 17, 2021

Related U.S. Application Data

(60) Provisional application No. 62/947,600, filed on Dec. 13, 2019.

(51) Int. Cl.
   *H04B 10/27*   (2013.01)
   *H04L 7/00*    (2006.01)
   *H04L 1/00*    (2006.01)

(52) U.S. Cl.
   CPC .......... *H04B 10/27* (2013.01); *H04L 1/004* (2013.01); *H04L 7/0075* (2013.01)

(58) Field of Classification Search
   CPC ........ H04B 10/27; H04L 1/004; H04L 7/0075
   USPC .......................................... 398/154
   See application file for complete search history.

(56) References Cited

U.S. PATENT DOCUMENTS

| 7,991,296 | B1* | 8/2011 | Johnston | H04J 3/0608 398/154 |
| 10,667,025 | B2* | 5/2020 | Ye | H04J 14/00 |
| 2011/0142437 | A1* | 6/2011 | Luo | H04J 3/0608 398/1 |
| 2012/0321313 | A1* | 12/2012 | Jin | H04J 3/0602 398/66 |

* cited by examiner

*Primary Examiner* — Dalzid E Singh
(74) *Attorney, Agent, or Firm* — 2SPL Patentanwälte PartG mbB; Yong Beom Hwang

(57) ABSTRACT

An optical network receiver (ONU) circuit associated with a passive optical network (PON) is disclosed. The ONU circuit comprises one or more processors is configured to operate in a hunt state, wherein the one or more processors is configured to detect frame boundaries associated with an incoming data signal based on a detecting a predefined synchronization (psync) pattern associated with the incoming data signal and transition to a pre-sync state, when the predefined psync pattern is detected correctly. The one or more processors is further configured to operate in the pre-sync state, wherein the one or more processors is configured to perform forward error correction (FEC) decoding for the incoming data signal, in order to determine signal statistics associated with the incoming data signal.

20 Claims, 2 Drawing Sheets

RECEIVER SYNCHRONIZATION FOR HIGHER SPEED PASSIVE OPTICAL NETWORKS

CROSS-REFERENCE TO RELATED APPLICATIONS

This application claims the benefit of U.S. 62/947,600, filed on Dec. 13, 2019, which is herein incorporated by reference in its entirety for all purposes.

FIELD

The present disclosure relates to optical network units (ONUs) and passive optical networks (PON). The present disclosure relates also to systems and methods for receiver synchronization for an optical network receiver, or optical network unit (ONU), associated with PONs.

BACKGROUND

PON systems operating at speeds such as 10 Gbit/s or 25 Gbit/s (IEEE 802.3ca) may use synchronization state machines. Data rates in passive optical networks (PON) are increasing, e.g., to 50 Gbit/s per wavelength. With increasing transmission speed, the quality of signal transmission can be a concern. For user data, this can be mitigated by improved forward error correction (FEC) and digital equalization (DEQ). With possibly increasing bit error rates of higher speed PON running on 25 Gbit/s or 50 Gbit/s, there may be a desire for improved synchronization and detection of loss of synchronization.

DETAILED DESCRIPTION

Figure 1:
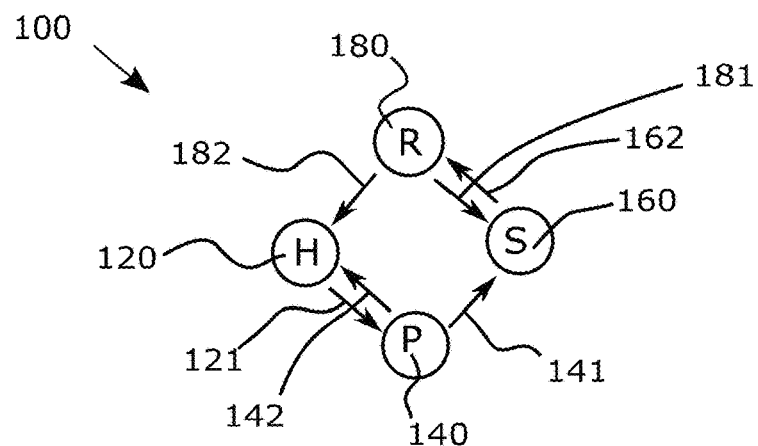
FIG. 1 illustrates a synchronization state machine.

FIG. 1 shows a synchronization state machine 100, according to examples described herein, which may be representative of an optical network receiver circuit (or optical network unit, ONU) for a passive optical network. The synchronization state machine 100 of FIG. 1 shows a hunt state 120, a pre-sync state 140, a sync state 160, and a re-sync state 180. There are transitions between states shown with arrows. Transitions may be designated as forward transitions 121, 141, 181 which lead to or toward the sync state 160. Transitions may be designated as back transitions 142, 162, 182 which lead to or toward the hunt state 120, which may be an initial state.

Figure 2:
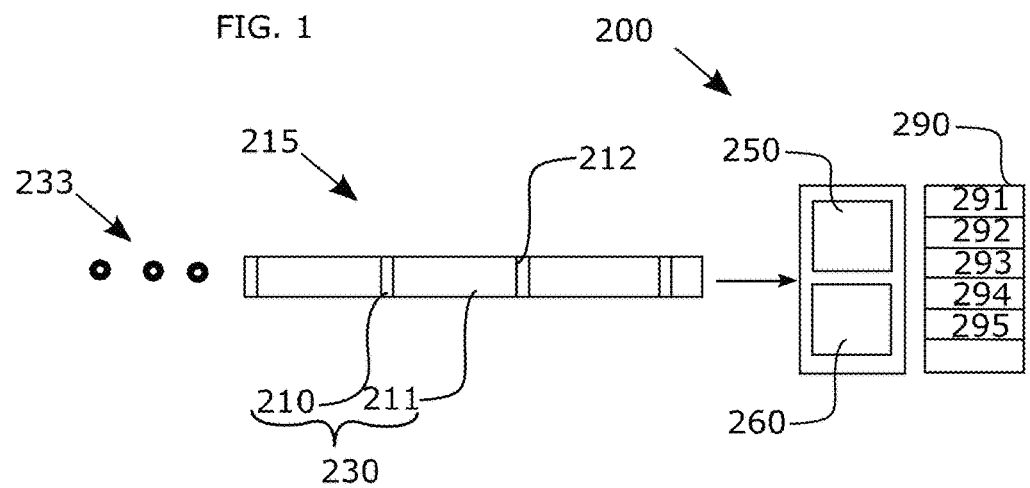
FIG. 2 illustrates an optical network unit and data signal.

FIG. 2 shows an incoming data signal 215 and optical network unit 200, or receiver circuit, according to examples described herein. The incoming data signal 215 may include frames 230, a psync pattern 210 (which can be a synchronization pattern), and/or blocks 211 of data. The frames 230 may be considered to include the psync pattern 210 and blocks 211. The data signal 215 may have frame boundaries 212 between frames 230, such as between consecutive frames, such as may be identified by being adjacent to psync patterns 210. FIG. 2 also illustrates a superframe 233 which may be a set of consecutive frames 230.

An optical network receiver (ONU) circuit 200 associated with a passive optical network (PON) can include one or more processors 250. The processor(s) may operate in a hunt state 120, transition 121 to a pre-sync state 140, and/or operate in the pre-sync state 140.

Operating in the hunt state 120, the one or more processors 250 may detect frame boundaries 212 associated with an incoming data signal 215. The detection may be based on a detecting a predefined synchronization (psync) pattern 210. The psync pattern 210 may be associated with a set of hunt frames 230 of one or more consecutive frames 230 associated with the incoming data signal. The hunt frames 230 may be received while in the hunt state 120.

When the predefined psync pattern 210 is detected correctly for at least one frame 230 of the set of hunt frames, the ONU 200 may transition 121 to the presync state 140. Compared to other methods of operation of an ONU, the forward transition 121 from hunt state 120 to pre-sync state 140 may occur more readily, particularly if the correct detection of the psync pattern 210 is a sufficient conditions for the state machine 100 to make the transition 121.

In the pre-sync state 140, the one or more processors 250 may perform forward error correction (FEC) decoding for a set of pre-sync frames 230. The pre-sync frames 230 may be received while the processor(s) 250 are in the pre-sync state 140. The pre-sync frames 230 may be one or more subsequent consecutive frames associated with the incoming data signal 215. The processor(s) may determine signal statistics 293 associated with the incoming data signal 215, such as by the FEC decoding 294 of the set of pre-sync frames. Compared to other methods of operation of an ONU, the determination of signal statistics 293 from the data, while in the pre-sync state 140, may be allowed to stay in the pre-sync state 140 for multiple frames 230.

Unlike other methods, the signal statistics 293 and/or decoding 294 may be leveraged to determine whether and how to transition, e.g. from the pre-sync state 140.

The one or more processors 250 can transition 141 to a sync state 160, such as when the FEC decoding 294 is successful for at least one frame 230 of the set of pre-sync frames. When in the sync state 160, the one or more processors 250 can perform FEC decoding 294 for a set of sync frames. The sync frames can be one or more subsequent consecutive frames 230 which may be received while in the sync state 160. If the FEC decoding 294 fails for at least one frame 230 of the set of sync frames, the processor(s) may transition to a re-sync state 180. Utilizing the FEC correction to ensure sync can aid in quickly detecting a loss of sync.

In the re-sync state 180, the processor(s) may perform FEC decoding 294 for a set of re-sync frames. The re-sync frames may include one or more subsequent consecutive frames 230. The re-sync frames may be received while in the re-sync state 180. When a number of failures associated with the consecutive FEC decoding 294 of the set of re-sync frames is less than a predefined decoding failure number 291, the processor(s) 250 may stay in the re-sync state 180. The processor(s) 250 may transition 181 to the sync state 160, such as when the FEC decoding 294 is successful for at least one frame 230 of the set of re-sync frames. The signal statistics 293 and/or decoding 294 may be leveraged to determine whether and how to transition.

The one or more processors 250, when operating in the re-sync state 180, may transition 182 to the hunt state 120, such as when the number of failures associated with the consecutive FEC decoding 294 of the set of re-sync frames reaches the predefined decoding failure number 291.

The one or more processors, when operating in the pre-sync state 140, may detect the psync pattern 210 for the set of pre-sync frames. When a number of number of errors associated with the psync pattern 210 of one frame 230 of the set of pre-sync frames is greater than a predefined psync threshold number 295, the processor(s) may transition back to the hunt state 120.

The FEC decoding 294 may include low-density parity-check (LDPC) decoding. Success of the FEC decoding 294 may be determined based on a set of parity check equations 292.

The state machine 100 can remain in a state 120, 140, 160, 180 while transition conditions are improved. For example, during startup, the ONU enters the hunt state 120 as an initial state. For example, the ONU remains in the hunt state 120 until the receiver is synchronized to the transmit clock and the digital equalizers are trained.

A PON ONU can be used to achieve frame and symbol synchronization when the ONU is connected to the PON network while the PON optical line termination (OLT) is transmitting. It can be desirable to avoid a false synchronization without a valid optical line termination (OLT) signal. When the link is active and synchronized, it can be desirable to detect a loss of sync quickly to re-synchronize the link without long service interruption. It can be desirable to avoid a false loss of sync, e.g., a re-sync being triggered when the link is stable. With the increasing bit error rate of higher speed PON running on 25 Gbit/s or 50 Gbit/s, the prior arts' synchronization and loss of synchronization mechanisms may not be sufficiently reliable. Improved FEC and DEQ methods can utilize information related to the frame and symbol boundaries for training signal statistics (for FEC) and equalizer coefficients (for DEQ).

The ONU 200 may have at least one processor 250 and a digital equalizer 260. The ONU may utilize or generate one or more decoding failure numbers 291 (e.g. via FEC decoding 294), such as a predefined decoding failure number; one or more parity check equations 292; one or more signal statistics 293 (e.g. associated with the incoming data signal 215); and any combination thereof. Herein, a low density parity check (LDPC) is a species of forward error correction (FEC).

For user data, transmission errors and other problems can be mitigated by improved forward error correction (FEC) and digital equalization (DEQ). During the link training, an ONU (optical network receiver), such as one represented by the state machine of FIG. 1, can detect the symbol and frame boundaries of the signal transmitted from the OLT (optical line termination). Improved FEC and DEQ methods can utilize information related to the frame and symbol boundaries for training signal statistics (for FEC) and equalizer coefficients (for DEQ). Herein are disclosed robust framing and symbol boundary detection methods and systems that can be used in higher speed (e.g. 25 Gbit/s or 50 Gbit/s) PON.

Returning to FIG. 1, the hunt state forward transition 121 from the hunt state 120 into the pre-sync state 140 can be performed when one or more frame boundaries 212 are detected correctly, such as by detecting the psync pattern 210. The symbol timing and/or frame timing can be detected correctly such that the receiver, e.g. state machine 100, is synchronized to the transmit clock. In addition, the digital equalizer(s) 260 may be converged sufficiently to detect the frame boundary 212, such as before the forward transition 121 from the hunt state 120 into the pre-sync state 140.

Transitions, especially forward transitions such as the hunt state forward transition 121 to pre-sync state 140; and pre sync forward transition 141 to sync state can be based at least in part on observation/identification/decoding of the psync pattern 210. The psync pattern 210 may be identified, preferably with zero errors, or with a low number of errors.

In an example, synchronization detection can be based exclusively on the pysnc pattern 210. The hunt forward transition 121 from hunt state 120 to pre-sync state 140 and/or the pre-sync forward transition 141 from pre-sync state 140 to sync state 160 can occur based exclusively on detection/identification/decoding of the psync pattern 210.

For example, when a 64 bit psync pattern is detected without error in the hunt state 120, the ONU can transition 121 to the pre-sync state 140. Alternatively, a detection of up to 2 errors may also be adequate to trigger the hunt forward transition 121 to the pre-sync state 140. If the forward transition is not exclusively based on the psync pattern 210, e.g. detection of the psync pattern with 2 errors or fewer, then the superframe counter (SFC) may also be used for synchronization. The superframe counter may be protected with a 2 error correcting, 3 error detecting code, for example.

The state machine 100, in the pre-sync state 140, can reverse transition 142 into the hunt state 120 from the pre-sync state 140 when too many errors are detected in the psync pattern 210 for multiple consecutive frames 230.

FIG. 1 illustrates a synchronization state machine 100 according to examples described herein. PON systems operating at lower speeds (e.g., 10 Gbit/s or 25 Gbit/s IEEE 802.3ca) can use a synchronization state machine 100 such as that illustrated in FIG. 1. The transitions can be based on observation of a known synchronization pattern (Psync pattern) 210, which can be identified without errors or with a low number of errors, e.g. up to 2 errors in a 64 bit sync pattern.

Relevant information in the header, the SFC, and the overhead control structure (OC) can be protected with a FEC that is independent of the data FEC. It is possible that the FEC can be enabled and disabled by the overhead control structure (OC).

In other methods of operating a state machine 100, ONU, or the like, there can be reliance on a lower raw bit error rate of the received signal 215, such as no errors, in order to detect the synchronization pattern 210 with low probability of mis-detection, and decode the overhead channels. Alternatively/additionally, receiver elements may require some training time, which may not be taken into account by other methods. It may not be possible, in other methods, to stay in the pre-sync state 140 for the time to train adaptive elements. Herein, a method of operation is described in which the option to enable and disable the FEC is not utilized, which may be useful for higher speed PON (e.g. at 25 or 50 Gbit/s or higher). For example, there may be no decoding of the overhead channel independent of the data FEC.

Synchronization detection can be based on the pysnc pattern 210, only, which can be used for the forward transition 121 from hunt state to pre-sync state and for the forward transition 141 from pre-sync state to hunt state. The receiver 200 can remain in the pre-sync state 140 as long as the sync pattern 210 is found, while the adaptive elements are trained to reach sufficient reliability to remain in sync. It is possible to take advantage of the data FEC (e.g., an LDPC code) to protect the overhead channels and to detect a loss of synchronization. The detection of the out-of-sync condition can be derived from the data FEC.

There can be an allowance for an increased bit error rate, particularly when in the pre-sync state 140 and/or when determining to forward transition 121 from the hunt state to the pre-sync state. A reliable transition into the synchronized state 160 is possible. Detection of an out-of-sync condition can be done quickly and reliably. The state machine 100 can stay in the pre-sync state 140 for the time required to come to a stable operation point. After a forward transition 141 from the pre-sync state 140 into the sync state 160, the state machine 100 can remain in the sync state 160, such as for as long as FEC decoding (e.g. LDPC decoding) is successful.

Robust frame and symbol boundary detection for operation of an ONU 200 is possible, for example. The states of the sync state machine 100 of FIG. 1 can be utilized: hunt state 120, pre-sync state 140, sync state 160, and re-sync state 180. The transition conditions, e.g. the conditions which may trigger or may be determined for transitions from one state to another, can be as in the examples described herein. For example, the ONU 200 can remain in the hunt state 120 until the receiver 200 is synchronized to the transmit clock and the digital equalizers are trained.

During startup, the ONU device can enter the hunt state 120 as an initial state. The forward transition 121 from the hunt state 120 into the pre-sync state 140 can be performed/triggered when the frame boundaries 212 are detected correctly by detecting the psync pattern 210. The symbol timing can be detected correctly and/or the receiver 200 can be synchronized to the transmit clock, and the forward transition 121 from hunt state to pre-sync state can be triggered. In addition, the digital equalizers 260 may be converged sufficiently such that the frame boundary 212 is detected.

The initial detection of frame boundaries 212 can be based on matching of a bit pattern, such as that of a sync pattern 210. The detection of the frame boundaries 212 can be checked for each incoming bit, which is, e.g., 25 or 50 billion times per second. The pattern matching may be designed such that the detection is successful after a few attempts, which can avoid long idle times. The probability of a mis-detect, e.g., an erroneous detection of a frame boundary 212 may be avoided. A mis-detect may delay a correct training of the link.

Figure 3:
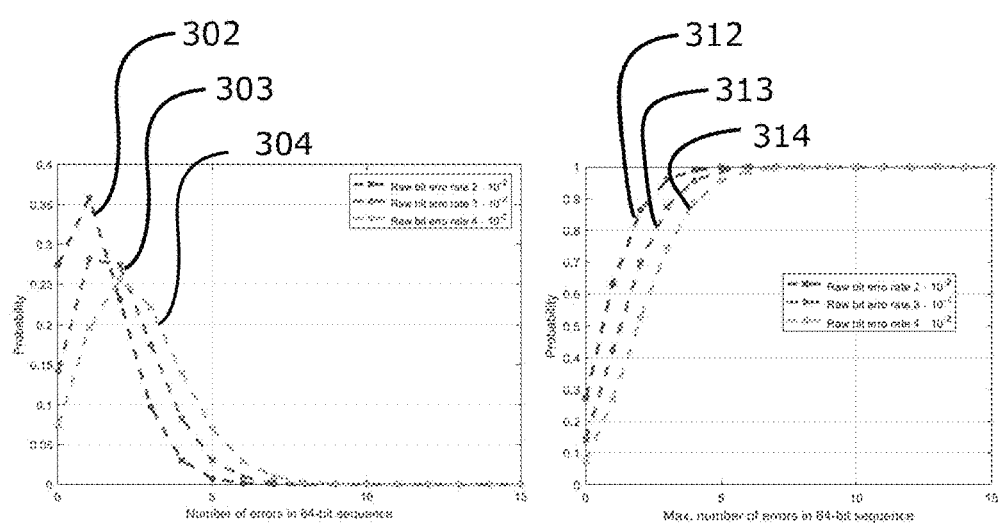
FIG. 3 illustrates principles of error detection probabilities in synchronization patterns.

FIG. 3 shows the probability for a certain number of errors in the pattern (left) and a certain maximum number of errors in the pattern (right), according to examples described herein. The vertical axes of FIG. 3 are each probability. FIG. 3 can be representative of a 64-bit synchronization (psync) pattern. FIG. 3 (left) shows the probability of a number of errors in a 64 bit sequence when the raw bit error rate is $2 \times 10^{-2}$ (trace 302), $3 \times 10^{-2}$ (trace 303), and $4 \times 10^{-2}$ (trace 304). FIG. 3 (right) shows the probability of a maximum number of errors in a 64 bit sequence when the raw bit error rate is $2 \times 10^{-2}$ (trace 312), $3 \times 10^{-2}$ (trace 313), and $4 \times 10^{-2}$ (trace 314).

The forward transition 121 from hunt state 120 into the pre-sync state 140 can happen quickly and/or be triggered when the raw bit error rate is in an expected range, such as below a maximum value. The forward transition 121 may not happen and/or may not be triggered when the bit error rate is too high. The forward transition 121 into the pre-sync state from the hunt state can be done when the sync pattern 210 is observed with a certain maximum number of errors, e.g., with 0 errors or with up to 1 error.

A forward transition 121 from hunt state 120 to pre-sync state 140 may occur in which there is no check of the superframe counter. Alternatively/additionally, a forward transition 121 from hunt state 120 to pre-sync state 140 may occur in which there is no FEC decoding of the SFC codeword. The state transitions can be thereby simplified. Other synchronization patterns and/or types of synchronization patterns are contemplated, e.g. a longer synchronization pattern. With a longer synchronization pattern, the desired bit error rate for a forward transition 121 from the hunt state 120 into the pre-sync state 140 can be controlled more finely/accurately. The complexity of the pattern search operation as well as the associated transmission overhead may increase with the length of the sync pattern 210.

With the introduction of soft decision input codes like LDPC codes, information on the signal statistics may be used for accurate soft information. In an example, only a raw bit error rate measurement may be required. With analog-to-digital converter-based receivers (ADC-based receivers), the signal probability density function for each possible transmit symbol can be measured. This may take some time until the measurement is sufficiently accurate to achieve the full decoder performance.

Figure 4:
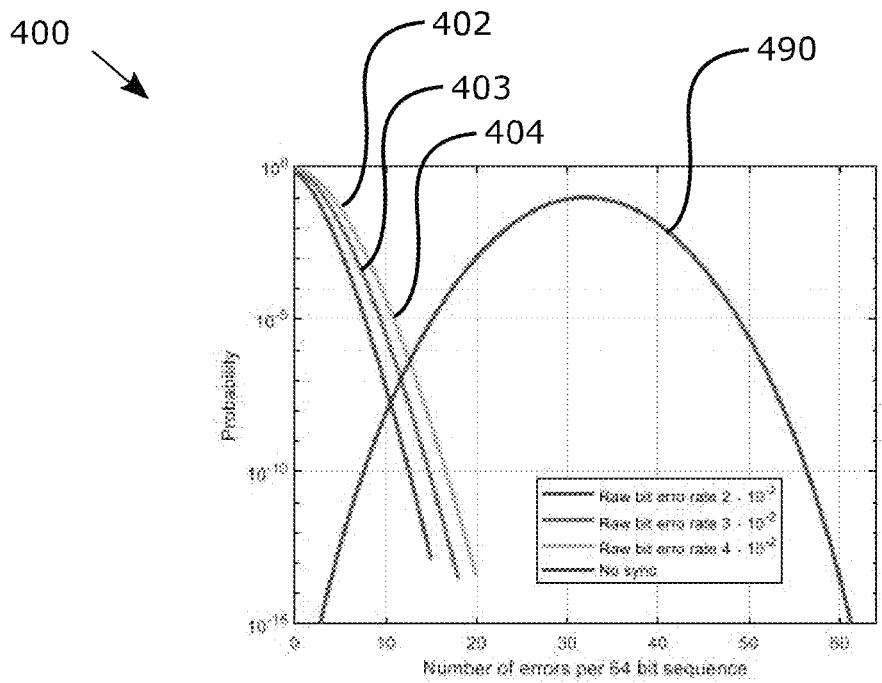
FIG. 4 illustrates principles of error detection probabilities in synchronization patterns.

It may be useful, as depicted in FIG. 4, to compare the probability of a number of errors found in a sync pattern, for different raw bit error rates, for different error rates (as well as for a lack of sync). FIG. 4 illustrates probabilities (vertical axis) for given numbers of errors per 64 bit sequence. When there is no sync, the probability of errors is given in trace 490. As can be seen from trace 490 of FIG. 4, the most likely number of errors in a 64 bit sequence is 32. FIG. 4 also shows the probability of the number of errors in the case where there is sync. FIG. 4 shows the probability of a number of errors in a 64 bit sequence when the raw bit error rate is $2 \times 10^{-2}$ (trace 402), $3 \times 10^{-2}$ (trace 403), and $4 \times 10^{-2}$ (trace 404).

To support the signal statistics measurement, it is possible to stay in the pre-sync state 140 for multiple frames 230, which may not be the case for other methods.

In case that the receive bit error rate is higher than expected and/or indicates that there is a loss of sync or an erroneous transition into the pre-sync state 140, the ONU 200 can back transition 142 from the pre-sync state 140 to the hunt state 120. FIG. 4 shows the probability to detect a 64 bit pattern with up to Nmax errors for different raw bit error rates. This can be compared to the probability of detecting the pattern 210 with up to Nmax errors in a random bit sequence, which can correspond to a loss of sync.

Observing FIG. 4, the ONU 200 can decide to stay in Pre-Sync state 140 when the number of errors is less than a threshold, e.g. a threshold defined by the intersection of the no sync curve 490 and the maximum bit error rate curve (402, 403, 404, which may depend on the tolerance for error), such as that illustrated in FIG. 2. For example, up to $N_{esync}=10$ errors can be the threshold for a system designed for up to 2e−2 raw bit error rate. In case that more than 10 errors are observed, a back transition 142 back into the hunt state 120 may be triggered. The value of $N_{esync}$ can be selected for the maximum raw bit error rate that is supported by the receiver 200 and/or not adjusted during synchronization.

In one example, a binary (hard decision) input signal $û_r \in \{0,1\}$ is available at the receiver 200, which can be used to derive the soft information for the LDPC decoder. In the pre-sync state 140, the error probabilities are measured. The transmitted bit sequence on the psync pattern $u_r$ is known to the receiver, which receives a sequence $û_r$. In a channel without memory, there are the probabilities for 0 transmitted and a 1 received $p_{u,û}(u=0,û=1)$ and the probability for 1 transmitted and 0 received $p_{u,û}(u=1,û=0)$, which are derived by counting the corresponding events. For a channel with memory, the probabilities are for $û=0$ or 1, for a given sequence of received bits $\hat{u}_{post}=[u_{t-N} \ldots u_{t-1}]$ and $\hat{u}_{pre}=[u_{t+1} \ldots u_{t+K}]$. $p_{u,\hat{u}}$, $\hat{u}_{post}$, $\hat{u}_{pre}$ can be measured by counting the corresponding events. In another example, an oversampled binary signal can be available at the receiver 200, e.g., a twice oversampled signal, the binary signal vectors may contain the intermediate samples, e.g., $\hat{u}_{post}=[u_{t-N}, u_{t-N+1/2} \ldots u_{t-1}, u_{t-1/2}]$ and $\hat{u}_{post}=[u_{t+1/2}, u_{t+1} \ldots u_{t+k-1/2}, u_{t+K}]$.

In another example, an analog-to-digital converter (ADC) with b bits is available at the receiver 200 and the receiver signal $y_t \in \{0, \ldots 2^b-1\}$ gives b bits per sample. In this case, the receiver 200 can measure the probability $p_{u,y}(u=0, y=0, \ldots, 2^b-1)$ and $p_{u,y}(u=1, y=0, \ldots, 2^b-1)$ for all possible values of y, using the Psync sequence 210. This can be practical if the resolution b of the analog-to-digital converter is low. With higher resolutions, it can be more practical to derive statistical parameters describing the receive signal, e.g., the mean of the receive signal for 0 transmitted $\mu(u=0)$ and for 1 transmitted $\mu(u=1)$ and the variances $\sigma^2(u=0)$ and $\sigma^2(u=1)$. When the statistics measurement is sufficiently stable, the statistics information can be used to derive the soft information for the LDPC decoder.

When the LDPC decoding is successful for multiple consecutive frames 230, e.g. at least 2 consecutive frames, and the superframe counter is valid, the ONU 200 can forward transition 141 into the sync state 160 from the pre-sync state 140.

In case of a loss of sync, particularly when in the sync state 160, a quick detection of the failure state is important to keep the service interruption short. The out-of-sync detection can be based on the LDPC decoder status. In one example, only one LDPC codeword per frame 230, e.g., the first codeword of the frame, is used to check the out-of-sync condition. A successful FEC decoding can be checked by a set of parity check equations 292. When all parity check equations 292 are satisfied for the hard decision output of the FEC decoder, the codeword is valid.

In case that one or more of the parity check equations 292 are un-satisfied, particularly while in the sync state 160, the decoding has failed. If this happens for the first codeword of one frame, the ONU can back transition 162 into the re-sync state 180 from the sync state 160. When, in the re-sync state 180, the decoding fails for M−1 more consecutive frames 230 for the first codeword of the frame 230, a loss of synchronization is detected and the ONU can back transition 182 to the hunt state 120 from the re-sync state 180.

In another example, each FEC codeword can be considered to detect the out-of-sync condition. When in the sync state 160, when decoding of any LDPC codeword fails and one or more of the parity check equations 292 are unsatisfied, the ONU 200 back transitions 162 into the re-sync state 180; and if, in the re-sync state 180, the decoding fails on another M−1 consecutive FEC codewords, a loss of synchronization is detected and the ONU back transitions 182 into the hunt state 120. With that, the out-of sync can be detected more quickly. The receiver 200 may thereby be more susceptible to back-transitions from the sync state 160 and/or re-sync state 180, particularly to error events which affect multiple consecutive codewords.

An Optical Networks Unit (ONU) or optical network receiver (ONU) circuit 200 for Passive Optical Networks (PON), which synchronizes to the OLT transmission is disclosed. Herein is described:

a hunt state 120, in which frame boundaries 212 are detected; the clock recovery can be established and adaptive digital equalizers 260 are optionally trained.

a pre-sync state 140 in which signal statistics for the soft input FEC can be determined.

a forward transition 121 from the initial (hunt) state 120 to the pre-sync state 140 which can be based on thresholds of the number of errors observed in a known (Psync) pattern 210, e.g. a psync pattern 210 that is sent with every frame 230. If the synchronization pattern 210 is found with a certain minimum number of errors (e.g. less than a maximum number of errors), the ONU 200 can forward transition 121 to the pre-sync state 140.

a back transition 142 from the pre-sync state 140 to the hunt state 120 can be triggered, for example, if, in the pre-sync state 140, the number of errors observed in the Psync pattern 210 exceeds a certain threshold.

a forward transition 141 to the synchronized state 160 from the pre-sync state 140 can be performed/triggered when the soft input FEC is correcting all codewords for multiple successive codewords, e.g. at least two consecutive codewords.

Herein, an Optical Networks Unit (ONU), or optical network receiver circuit 200, for Passive Optical Networks (PON) is described. The ONU 200 can detect a loss of synchronization based on multiple consecutive failures of the data FEC, e.g. based on un-satisfied parity check equations 292.

Figure 5:
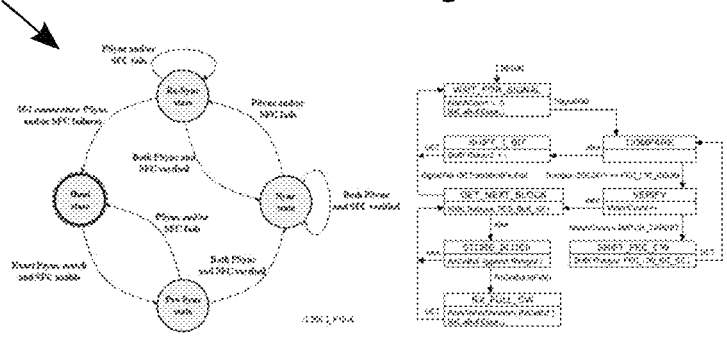
FIG. 5 illustrates a synchronization state machine.

FIG. 5 illustrates a synchronization state machine 500 according to examples described herein. The example illustrated in FIG. 5 may be compared to that of FIG. 1. The synchronization state machine of FIG. 5 may be representative of an optical network receiver circuit (or optical network unit, ONU) for a passive optical network. The synchronization state machine 500 of FIG. 5, like that of FIG. 1, shows a hunt state, a pre-sync state, a sync state, and a re-sync state.

As illustrated in FIG. 5, a transition from hunt state to pre-sync state may be triggered when there is a detection of the psyc pattern with no errors, and the superframe counter (SFC) is usable. A back transition may occur when the psync and/or SFC fails. A forward transition from the pre-sync state to the sync state may be triggered and/or occur when both the psync and SFC are verified. In the sync state, when both the psync pattern and the SFC are verified, the ONU can remain in the sync state. When at least one of the psync pattern and the SFC fails, there can be (triggered) a back transition to the re-sync state. A forward transition to the sync state from the re-sync state can occur if bot the psync pattern and the SFC are verified. Otherwise, if there are Pscyn and/or SFC failures, the ONU can remain in the re-sync state up to a certain number of consecutive PSync and/or SFC failures, e.g. M−1, at which there can be triggered a back transition from the re-sync state to the hunt state.

Figure 6:
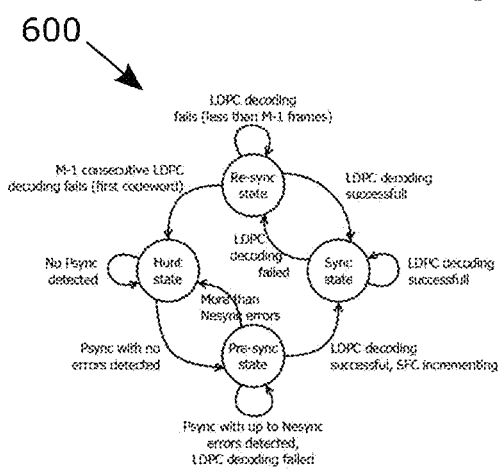
FIG. 6 illustrates a synchronization state machine.

FIG. 6 illustrates a synchronization state machine 600 according to examples described herein. The example illustrated in FIG. 6 may be compared to that of FIG. 1. The synchronization state machine 600 of FIG. 6 may be representative of an optical network receiver circuit (or optical network unit, ONU) for a passive optical network. The synchronization state machine 600 of FIG. 6, like that of FIG. 1, shows a hunt state, a pre-sync state, a sync state, and a re-sync state.

As illustrated in FIG. 6, a transition from hunt state to pre-sync state may be triggered when there is a detection of the psyc pattern with no errors. The ONU may stay in the pre-sync state when there is up to Nesync errors detected, and/or LDPC decoding fails. When there are more than Nesync errors, a back transition from the pre-sync state to the hunt state may be triggered. It is possible that the SFC is not utilized in the determinations to remain or transition between the pre-sync state and hunt state.

A forward transition from the pre-sync state to the sync state may be triggered and/or occur when LDPC decoding is successful and/or SFC is incrementing. The ONU may remain in the sync state while the LDPC decoding is successful; LDPC decoding success may be the only requirement to remain in the sync state. If LDPC decoding fails, there can be triggered a transition from sync state to re-sync state; LDPC decoding failure may be the only requirement to trigger the transition. When, in the re-sync state, and the LDPC decoding is successful, there can be a transition to the sync state; LDPC decoding success may be the only requirement to transition from the re-sync state to the sync state. The ONU can remain in the re-sync state when there are LDPC decoding failures, however, when there are a threshold number of consecutive LDPC decoding failures, e.g. M−1, a transition from re-sync state to hunt state can be triggered. The ONU remains in the hunt state while no psync pattern is detected.

FIG. 6 illustrates an optical network receiver (ONU) circuit associated with a passive optical network (PON). The ONU includes one or more processors. The processors can operate in a hunt state. When frame boundaries associated with an incoming data signal are detected, based on a detecting a predefined synchronization (psync) pattern associated with a set of frames (e.g. hunt frames), the ONU can transition to a pre-sync state. The hunt frames may be one or more consecutive frames associated with the incoming data signal, which are detected while the ONU is in the hunt state. When the predefined psync pattern is detected correctly for at least one frame of the set of hunt frames, the transition to the pre-sync state can occur.

In the pre-sync state, the one or more processors performs forward error correction (FEC) decoding for a set of pre-sync frames, e.g. one or more subsequent consecutive frames associated with the incoming data signal which are received while in the pre-sync state. The processor(s) can determine signal statistics associated with the incoming data signal. The statistics can be based at least in part on FEC decoding.

As illustrated in FIG. 6, the one or more processors can transition to a sync state, when the FEC decoding is successful for at least one frame of a set of pre-sync frames, e.g. frames received while in the pre-sync state.

As illustrated in FIG. 6, the one or more processors in the sync state, can perform FEC decoding for a set of sync frames, which may be received while in the sync state. The sync frames may include one or more subsequent consecutive frames. When the FEC decoding fails for at least one frame of the set of sync frames, the ONU may transition to the re-sync state.

In the re-sync state, FEC decoding may occur for a set of re-sync frames, which may be frames received while in the re-sync state. The re-sync frames may be one or more subsequent consecutive frames. The ONU may stay in the re-sync state while a number of failures associated with the consecutive FEC decoding of the set of re-sync frames is less than a predefined decoding failure number, which may be a type of threshold. When the FEC decoding is successful for at least one frame of the set of re-sync frames, there may be a transition back to the sync state.

From the re-sync state, it is also possible to transition back to the hunt state, such as when the number of failures associated with the consecutive FEC decoding of the set of re-sync frames reaches a predefined decoding failure number.

The FEC decoding can include a low-density parity-check (LDPC) decoding.

Herein, success of the FEC decoding can be determined based on a set of parity check equations.

Figure 7:
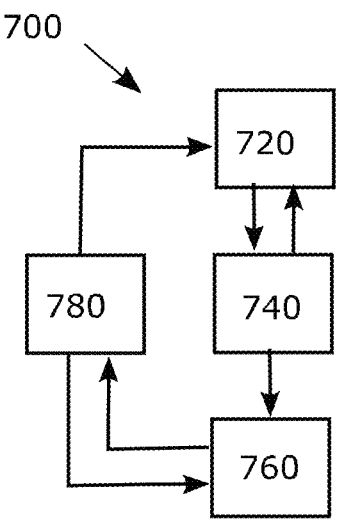
FIG. 7 illustrates a method of operating an ONU.

FIG. 7 illustrates a method 700 of operating an optical network receiver (ONU), such as in a PON. The network receiver may be operated, as illustrated in the method 700 depicted in FIG. 7, in accordance with the descriptions to the state machines 100, 500, 600, described herein; the state machines 100, 500, 600 described herein may operate in accordance with the method 700 described herein.

As an initial state, the ONU may operate in a hunt state 720, which may transition to a pre-sync state 740. A back transition from the pre-sync state 740 to the hunt state is possible. A forward transition from the pre-sync state 740 into a sync state 760 is also possible. From the sync state 760, there may be a back transition to a re-sync state 780. A transition from the sync state 760 back to the pre-sync state 740 may not be allowed, according to an example. From the re-sync state 780, there may be either a back transition or a forward transition, to the hunt state 720 and sync state 760, respectively. From the hunt state 720, it may be that the only transition allowed is to the pre-sync state 740.

FIG. 7 may illustrate a method 700 for an optical network receiver (ONU) circuit 200 which includes one or more processors 250. The method 700 includes operating the one or more processors in a hunt state 720. The one or more processors 250 can detect frame boundaries associated with an incoming data signal based on a detecting a predefined synchronization (psync) pattern associated with a set of hunt frames. The hunt frames may include one or more consecutive frames 230 associated with the incoming data signal 215. The processor(s) 250 may transition to a pre-sync state 740, such as when the predefined psync pattern 210 is detected correctly for at least one frame 230 of the set of hunt frames.

The one or more processors 250, in the pre-sync state 740, may perform forward error correction (FEC) decoding 294 for a set of pre-sync frames, which may be one or more subsequent consecutive frames 230 associated with the incoming data signal 215. The pre-sync frames may be received while in the pre-sync state 740. The pre-sync frames and the FEC decoding may be used to determine signal statistics 293 associated with the incoming data signal 215.

As illustrated in FIG. 7, there may be a transition, e.g. by the one or more processors 250, to a sync state 760, such as when the FEC decoding is successful for at least one frame of the set of pre-sync frames.

The method 700 illustrated in FIG. 7 may also include operating the one or more processors, in the sync state 760, in which FEC decoding is performed for a set of sync frames of one or more subsequent consecutive frames. The sync frames may be received while in the sync state 760. The method may allow for a transition to a re-sync state 780, such as when the FEC decoding fails for at least one frame of the set of sync frames.

As illustrated in FIG. 7, the method 700 may include operating the one or more processors in the re-sync state 780. The one or more processors can perform FEC decoding for a set of re-sync frames of one or more subsequent consecutive frames, which may be received while in the re-sync state. From the re-sync state 780, there may be a transition back (or forward) to the sync state 760, such as when the FEC decoding is successful for at least one frame of the set of re-sync frames.

The one or more processors may transition from the re-sync state 780 back to the hunt state 720, such as when the number of failures associated with the consecutive FEC decoding of the set of re-sync frames reaches a predefined decoding failure number.

The one or more processors may detect the psync pattern for the set of pre-sync frames, such as when the one or more processors is operating in the pre-sync state 740.

The processor(s) may transition back to the hunt state 720, for example when a number of errors associated with the psync pattern of one frame of the set of pre-sync frames is greater than a predefined psync threshold number.

With reference to FIGS. 1, 6, and 7, an optical network receiver circuit (ONU) for a passive optical network (PON) can have the one or more processors configured to operate in each of a hunt state, a pre-sync state, a sync state, and a re-sync state. The ONU may transition from the hunt state to the pre-sync state, transition from the pre-sync state to the sync state, transition from the sync state to the re-sync state, and transition from the re-sync state to the hunt state.

A first sufficient and/or necessary condition for a transition from the hunt state to the pre-sync state can be that a sync pattern is detected with no errors while in the hunt state. A second sufficient and/or necessary condition for a second transition from the pre-sync state to the hunt state can be a detection of errors of the sync pattern above a threshold while in the pre-sync state. A third sufficient and/or necessary condition for a third transition from the sync state to the re-sync state can be forward error check decoding failure of at least one frame received while in the sync state. A fourth sufficient and/or necessary condition for a fourth transition from the re-sync state to the sync state can be a successful forward error check decoding of at least one frame received while in the re-sync state.

The transition from the hunt state to the pre-sync state can be directly reversible; the ONU can transition back and forth directly between hunt and pre-sync state depending on conditions. The transition from the pre-sync state to the sync state can be directly irreversible; going from pre-sync state to the sync state may be possible, while the direct transition from the sync state directly back to the pre-sync state may not be allowed. As seen in the relevant figures (e.g. FIGS. 1, 6, and 7), the transition from the sync state to the re-sync state can be directly reversible. The transition from the re-sync state to the hunt state can directly irreversible.

The ONU can remain in the pre-sync state when the errors detected of the sync pattern are equal to or less than the threshold and the forward error check decoding fails. The threshold can be more than zero.

The apparatus and methods described herein may aid in reliable, rapid, and/or robust synchronization of optical network receivers associated with passive optical networks, particularly those operating at higher speeds such as 25 Gbit/s, 50 Gbit/s. Alternatively/additionally, the apparatus and methods may allow for rapid detection of loss of synchronization, and robust and/or rapid means of returning to synchronization.

Examples can include subject matter such as a method, means for performing acts or blocks of the method, and at least one machine-readable medium (e.g. a computer readable medium, which may be a nontransitory medium) including instructions that, when performed by a machine cause the machine to perform acts of the method or of an apparatus or system for concurrent communication using multiple communication technologies according to examples described herein.

For convenience and/or further description, an enumerated list of examples are provided hereinbelow.

Example 1 is an optical network receiver (ONU) circuit associated with a passive optical network (PON) comprising one or more processors configured to operate in a hunt state, wherein the one or more processors is configured to detect frame boundaries associated with an incoming data signal based on a detecting a predefined synchronization (psync) pattern associated with a set of hunt frames comprising one or more consecutive frames associated with the incoming data signal; transition to a pre-sync state, when the predefined psync pattern is detected correctly for at least one frame of the set of hunt frames; and operate in the pre-sync state, wherein the one or more processors is configured to perform forward error correction (FEC) decoding for a set of pre-sync frames comprising one or more subsequent consecutive frames associated with the incoming data signal. Optionally, the FEC decoding, particularly while in the pre-sync state, may be used to determine signal statistics associated with the incoming data signal.

Example 2 is an ONU circuit, including the subject matter of example 1, wherein the one or more processors is further configured to transition to a sync state, when the FEC decoding is successful for at least one frame of the set of pre-sync frames.

Example 3 is an ONU circuit, including the subject matter of any of examples 1-2, including or omitting elements, wherein the one or more processors, when operating in the sync state, is configured to perform FEC decoding for a set of sync frames comprising one or more subsequent consecutive frames; and transition to re-sync state, when the FEC decoding fails for at least one frame of the set of sync frames.

Example 4 is an ONU circuit, including the subject matter of any of examples 1-3, including or omitting elements, wherein the one or more processors, when operating in the re-sync state, is further configured to perform FEC decoding for a set of re-sync frames comprising one or more subsequent consecutive frames; stay in the re-sync state, when a number of failures associated with the consecutive FEC decoding of the set of re-sync frames is less than a predefined decoding failure number; and transition back to the sync state, when the FEC decoding is successful for at least one frame of the set of re-sync frames.

Example 5 is an ONU circuit, including the subject matter of any of examples 1-4, including or omitting elements, wherein the one or more processors, when operating in the re-sync state, is further configured to transition back to the hunt state, when the number of failures associated with the consecutive FEC decoding of the set of re-sync frames reaches the predefined decoding failure number.

Example 6 is an ONU circuit, including the subject matter of any of examples 1-5, including or omitting elements, wherein the one or more processors, when operating in the pre-sync state, is further configured to detect the psync pattern for the set of pre-sync frames; and transition back to the hunt state, when a number of number of errors associated with the psync pattern of one frame of the set of pre-sync frames is greater than a predefined psync threshold number.

Example 7 is an ONU circuit, including the subject matter of any of examples 1-6, including or omitting elements, wherein the FEC decoding comprises low-density paritycheck (LDPC) decoding.

Example 8 is an ONU circuit, including the subject matter of any of examples 1-7, including or omitting elements, wherein a success of the FEC decoding is determined based on a set of parity check equations.

Example 9 is a method for an optical network receiver (ONU) circuit comprising one or more processors, the method comprising operating, the one or more processors, in a hunt state, wherein the one or more processors is configured to detect frame boundaries associated with an incoming data signal based on a detecting a predefined synchronization (psync) pattern associated with a set of hunt frames comprising one or more consecutive frames associated with the incoming data signal; transitioning, the one or more processors, to a pre-sync state, when the predefined psync pattern is detected correctly for at least one frame of the set of hunt frames at the one or more processors; and operating, the one or more processors, in the pre-sync state, wherein the one or more processors is configured to perform forward error correction (FEC) decoding for a set of pre-sync frames comprising one or more subsequent consecutive frames associated with the incoming data signal. Optionally, the FEC decoding, particularly while in the pre-sync state, may be used to determine signal statistics associated with the incoming data signal.

Example 10 is a method, including the subject matter of example 9, further comprising transitioning, the one or more processors, to a sync state, when the FEC decoding is successful for at least one frame of the set of pre-sync frames.

Example 11 is a method, including the subject matter of any of examples 9-10, including or omitting elements, further comprising operating, the one or more processors, in the sync state, wherein the one or more processors is configured to perform FEC decoding for a set of sync frames comprising one or more subsequent consecutive frames; and transitioning, the one or more processors, to a re-sync state, when the FEC decoding fails for at least one frame of the set of sync frames.

Example 12 is a method, including the subject matter of any of examples 9-11, including or omitting elements, further comprising operating, the one or more processors, in the re-sync state, wherein the one or more processors is configured to perform FEC decoding for a set of re-sync frames comprising one or more subsequent consecutive frames; and transitioning, the one or more processors, back to the sync state, when the FEC decoding is successful for at least one frame of the set of re-sync frames.

Example 13 is a method, including the subject matter of any of examples 9-12, including or omitting elements, further comprising transitioning the one or more processors from the re-syn state back to the hunt state, when the number of failures associated with the consecutive FEC decoding of the set of re-sync frames reaches the predefined decoding failure number.

Example 14 is a method, including the subject matter of any of examples 9-13, including or omitting elements, further comprising detecting, using the one or more processors, the psync pattern for the set of pre-sync frames, when the one or more processors is operating in the pre-sync state; and transitioning, the one or more processors, back to the hunt state, when a number of number of errors associated with the psync pattern of one frame of the set of pre-sync frames is greater than a predefined psync threshold number.

Example 15 is a method, including the subject matter of any of examples 9-14, including or omitting elements, wherein the FEC decoding comprises low-density paritycheck (LDPC) decoding.

Example 16 is an optical network receiver circuit for a passive optical network (PON), including one or more processors. The processor(s) operate in each of a hunt state, a pre-sync state, a sync state, and a re-sync state. The processor(s) can transition from the hunt state to the pre-sync state, transition from the pre-sync state to the sync state, transition from the sync state to the re-sync state, and transition from the re-sync state to the hunt state. A first sufficient condition for a transition from the hunt state to the pre-sync state is that a sync pattern is detected with no errors while in the hunt state. A second sufficient condition for a second transition from the pre-sync state to the hunt state is a detection of errors of the sync pattern above a threshold while in the pre-sync state.

In example 17, which includes the optical network receiver circuit of example 16, the transition from the hunt state to the pre-sync state is directly reversible. The transition from the pre-sync state to the sync state is directly irreversible. The transition from the sync state to the re-sync state is directly reversible. The transition from the re-sync state to the hunt state is directly irreversible.

Example 18, which includes the optical network receiver circuit of either examples 16 or 17, has the processors configured such that a third sufficient condition for a third transition from the sync state to the re-sync state is forward error check decoding failure of at least one frame received while in the sync state.

Example 19, which includes the optical network receiver circuit of any of examples 16-18. The optical network receiver circuit of claim 18, wherein the one or more processors is configured such that a sufficient condition for a transition from the re-sync state to the sync state is a successful forward error check decoding of at least one frame received while in the re-sync state.

Example 20 is the optical network receiver circuit of any or claim 17-19, in which the one or more processors can remain in the pre-sync state when the errors detected of the sync pattern are equal to or less than the threshold, and the forward error check decoding fails. The threshold can be more than zero.

Herein, a transition from one state to another state may be described to be a back transition or forward transition; "forward" and "back" are used to aid in understanding. A back transition does not require that the device, ONU, state machine, or the like to have previously been in the state to which the "back transition" occurs; nevertheless a back transition to a previous state is possible. "Back transition" may be used to indicate a transition that brings the machine from an initial state into the hunt state or closer to the hunt state. Similarly, "forward" transitions may not necessarily require that the state machine is advancing to a state in which the machine has not already been. "Forward transition" may be used to indicate a transition that brings the device, ONU, state machine, or the like from an initial state into the sync state or closer to the sync state.

Herein a set of frames is not necessarily a superframe. For example, a set of consecutive frames is not necessarily a superfame. A set of frames, e.g. a set of consecutive frames, may be fewer in number than that of a superframe.

Herein, adaptive elements may refer to digital equalizers.

Herein, parity check equation(s) may determine the success of FEC decoding.

Herein, the meeting of various conditions, described herein according to various examples, may be considered to trigger a transition from one state to another of an ONU, state machine, and/or processor(s). To "trigger" or "be triggered" may be used in the sense of to allow or to have met condition(s), e.g. necessary and/or sufficient condition(s), for the transition of state.

The transition may be considered to be a transition from one state to another of a processor or plurality of processors.

Conditions may be as described herein and/or described in the figures, such as FIGS. 5 and/or 6. For example, the text of FIG. 6 associated with arrows between states shows conditions for transitions between states. For example, the conditions described in FIG. 6 may be the only condition(s) which are met to cause/trigger a particular transition; e.g. a psync detection with no errors is necessary and sufficient for the transition from hunt state to pre-sync state (see FIG. 6); e.g. a successful LDPC decoding is necessary and sufficient for the transition from re-sync state to sync state occurs (see FIG. 6).

Herein a receiver such as an optical network receiver may be regarded as a type of optical network unit and/or circuit. The abbreviation ONU may refer to an optical network unit, or, more specifically, to an optical network receiver, optical network receiver circuit, and/or optical network receiver circuitry. Optical network receiver circuit, and optical network receiver circuitry may be used interchangeably. Herein ONU may refer to a circuit, receiver, an optical receiver, and/or an optical receiver unit; herein a state machine may refer to an ONU. Herein frame boundary detection may refer to detection of multiple frame boundaries.

Herein "state machine," "synchroniziation state machine," "sync state machine," and "system" may be used interchangeably.

Herein the term $N_{esync}$ may refer to a type of threshold.

Herein a trailing(s) indicates one or more items; for example, processor(s) means one or more processors.

While examples of apparatuses have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A circuit for a passive optical network (PON) comprising:
   one or more processors configured to:
      operate in a hunt state, wherein the one or more processors is configured to detect frame boundaries associated with an incoming data signal based on detecting a predefined synchronization (psync) pattern associated with a set of hunt frames comprising one or more consecutive frames associated with the incoming data signal;
      transition to a pre-sync state if the predefined psync pattern is detected correctly for at least one frame of the set of hunt frames; and
      operate in the pre-sync state, wherein the one or more processors is configured to perform forward error correction (FEC) decoding on a payload data portion of a set of pre-sync frames comprising one or more subsequent consecutive frames associated with the incoming data signal and detect a loss of synchronization in the pre-sync state based on the FEC decoding on the payload data portion.

2. The circuit of claim 1, wherein the one or more processors is further configured to transition to a sync state from the pre-sync state, when the FEC decoding is successful for at least one frame of the set of pre-sync frames, and
   wherein the one or more processors is further configured to determine signal statistics associated with the incoming data signal while in the pre-sync state.

3. The circuit of claim 2, wherein the one or more processors, when operating in the sync state, is configured to:
   perform FEC decoding for a set of sync frames comprising one or more subsequent consecutive frames; and
   transition to a re-sync state, when the FEC decoding fails for at least one frame of the set of sync frames.

4. The circuit of claim 3, wherein the one or more processors, when operating in the re-sync state, is further configured to:
   perform FEC decoding for a set of re-sync frames comprising one or more subsequent consecutive frames;
   stay in the re-sync state, when a number of failures associated with the consecutive FEC decoding of the set of re-sync frames is less than a predefined decoding failure number; and
   transition back to the sync state, when the FEC decoding is successful for at least one frame of the set of re-sync frames.

5. The circuit of claim 4, wherein the one or more processors, when operating in the re-sync state, is further configured to transition back to the hunt state, when the number of failures associated with the consecutive FEC decoding of the set of re-sync frames reaches the predefined decoding failure number.

6. The circuit of claim 2, wherein the one or more processors, when operating in the pre-sync state, is further configured to:
   detect the psync pattern for the set of pre-sync frames; and
   transition back to the hunt state, when a number of errors associated with the psync pattern of one frame of the set of pre-sync frames is greater than a predefined psync threshold number.

7. The circuit of claim 1, wherein the FEC decoding comprises low-density parity-check (LDPC) decoding.

8. The circuit of claim 1, wherein a success of the FEC decoding is determined based on a set of parity check equations.

9. A method of using a circuit in a passive optical network (PON) comprising one or more processors, the method comprising:
   operating, the one or more processors, in a hunt state, wherein the one or more processors is configured to detect frame boundaries associated with an incoming data signal based on detecting a predefined synchronization (psync) pattern associated with a set of hunt frames comprising one or more consecutive frames associated with the incoming data signal;

transitioning, the one or more processors, to a pre-sync state, when the predefined psync pattern is detected correctly for at least one frame of the set of hunt frames at the one or more processors; and operating, the one or more processors, in the pre-sync state, wherein the one or more processors is configured to perform forward error correction (FEC) decoding on a payload data portion of a set of pre-sync frames comprising one or more subsequent consecutive frames associated with the incoming data signal and detect a loss of synchronization in the pre-sync state based on the FEC decoding on the payload data portion.

10. The method of claim 9, further comprising transitioning, the one or more processors, to a sync state, when the FEC decoding is successful for at least one frame of the set of pre-sync frames.

11. The method of claim 10, further comprising:

operating, the one or more processors, in the sync state, wherein the one or more processors is configured to perform FEC decoding for a set of sync frames comprising one or more subsequent consecutive frames; and transitioning, the one or more processors, to a re-sync state, when the FEC decoding fails for at least one frame of the set of sync frames.

12. The method of claim 11, further comprising:

operating, the one or more processors, in the re-sync state, wherein the one or more processors is configured to perform FEC decoding for a set of re-sync frames comprising one or more subsequent consecutive frames; and transitioning, the one or more processors, back to the sync state, when the FEC decoding is successful for at least one frame of the set of re-sync frames.

13. The method of claim 12, further comprising transitioning the one or more processors from the re-syn state back to the hunt state, when the number of failures associated with the consecutive FEC decoding of the set of re-sync frames reaches the predefined decoding failure number.

14. The method of claim 11, further comprising:

detecting, using the one or more processors, the psync pattern for the set of pre-sync frames, when the one or more processors is operating in the pre-sync state; and transitioning, the one or more processors, back to the hunt state, when a number of errors associated with the psync pattern of one frame of the set of pre-sync frames is greater than a predefined psync threshold number.

15. The method of claim 10, wherein the FEC decoding comprises low-density parity-check (LDPC) decoding; and wherein operating the one or more processors in the pre-sync state further includes determining signal statistics associated with the incoming data signal.

16. A circuit for a passive optical network (PON) comprising:

one or more processors, configured to:

operate in each of a hunt state, a pre-sync state, a sync state, and a re-sync state, and transition from the hunt state to the pre-sync state, transition from the pre-sync state to the sync state, transition from the sync state to the re-sync state, and transition from the re-sync state to the hunt state; and the one or more processors is configured such that:

a first sufficient condition for a transition from the hunt state to the pre-sync state is that a sync pattern has no errors while in the hunt state, and a second sufficient condition for a second transition from the pre-sync state to the hunt state is that errors of the sync pattern are above a threshold while in the pre-sync state.

17. The circuit of claim 16, wherein the one or more processors is configured such that:

the transition from the hunt state to the pre-sync state is directly reversible, the transition from the pre-sync state to the sync state is directly irreversible, the transition from the sync state to the re-sync state is directly reversible, the transition from the re-sync state to the hunt state is directly irreversible.

18. The circuit of claim 17, wherein the one or more processors is configured such that:

a third sufficient condition for a third transition from the sync state to the re-sync state is forward error check decoding failure of at least one frame received while in the sync state.

19. The circuit of claim 18, wherein the one or more processors is configured such that:

a fourth sufficient condition for a fourth transition from the re-sync state to the sync state is a successful forward error check decoding of at least one frame received while in the re-sync state.

20. The circuit of claim 17, wherein the one or more processors is configured to remain in the pre-sync state when the errors detected of the sync pattern are equal to or less than the threshold, and the forward error check decoding fails; and wherein the threshold is more than zero.

* * * * *